United States Patent
Baker

[15] 3,638,069
[45] Jan. 25, 1972

[54] LIGHTING SYSTEMS FOR ROAD VEHICLES

[72] Inventor: Alfred Dickens Baker, Solihull, England
[73] Assignee: Joseph Lucas (Industries) Limited, Birmingham, England
[22] Filed: Feb. 18, 1970
[21] Appl. No.: 12,169

[30] Foreign Application Priority Data

Feb. 24, 1969 Great Britain..................9,702/69

[52] U.S. Cl. ......................................315/82, 240/7.1, 240/62
[51] Int. Cl. ........................................B60q 1/02, B60q 1/10
[58] Field of Search..............315/82, 77; 240/7.1, 62, 62.2, 240/62.3, 61.9, 62 H

[56] References Cited

UNITED STATES PATENTS 2,885,565  5/1959  Davis............................240/62.2 UX
3,316,397  4/1967  Yssel.............................240/62.3 X

FOREIGN PATENTS OR APPLICATIONS 517,637  2/1953  Belgium..............................240/62

Primary Examiner—Ronald L. Wibert
Assistant Examiner—T. Major
Attorney—Holman & Stern

[57] ABSTRACT

A lighting system for a road vehicle includes a member which is movable longitudinally to adjust the inclination of the beams of the headlamps relative to the vehicle. Sensing means is provided on the vehicle for sensing the attitude of the body of the vehicle relative to the ground, and a light source is movable in response to the signal received from the sensing means. A pair of light-sensitive devices are positioned side-by-side, and control operation of an actuating device for moving the headlamp-adjusting member. The headlamp-adjusting member carries a mask which is movable between the light-sensitive devices and the light source, and which, when the headlamps are correctly inclined for a given attitude of the body of the vehicle relative to the ground, masks both of the light-sensitive devices from the light source. When both of the light-sensitive devices are masked then the actuating device is inoperative. However, if the attitude of the body of the vehicle relative to the ground changes the light source is moved accordingly, and light falls on one or other of the light-sensitive devices. When light falls on one of the light-sensitive devices the actuating device is operated to move the headlamp-adjusting member to adjust the inclination of the headlamp beams in the correct direction so that the stable position is reestablished where the mask blocks light from falling on both of the light-sensitive devices.

4 Claims, 5 Drawing Figures

PATENTED JAN 25 1972 3,638,069
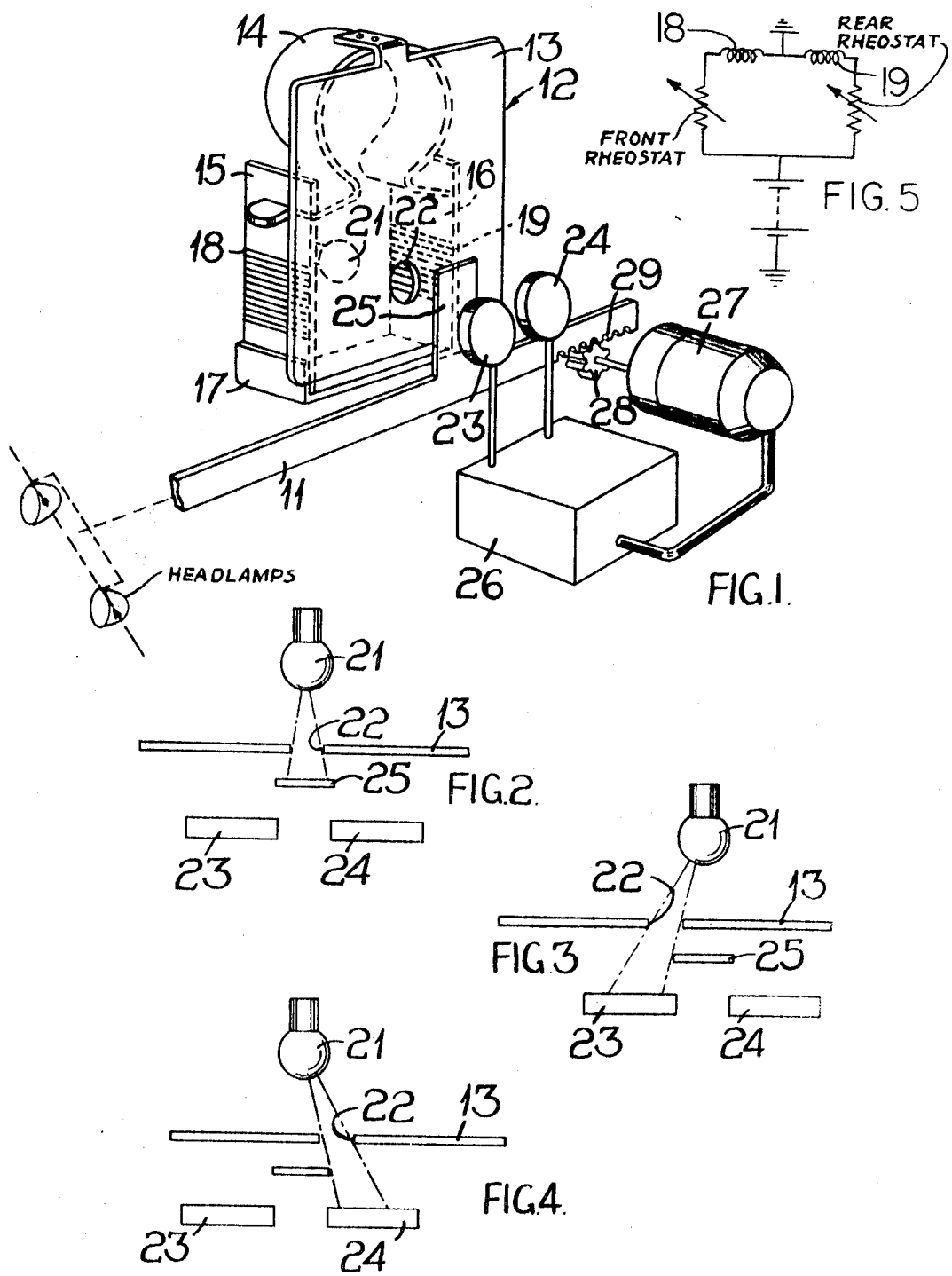

LIGHTING SYSTEMS FOR ROAD VEHICLES

This invention relates to lighting systems for road vehicles.

A lighting system according to the invention includes, sensing means for sensing the attitude of the body of the road vehicle relative to the ground, a light source movable by said sensing means in response to changes in the attitude of the body of the vehicle relative to the ground, a pair of light-sensitive devices positioned adjacent on another and aligned in a direction parallel to the direction of movement of said light source, a member movable in a direction parallel to the direction of movement of said light source, a member movable in a direction parallel to the direction of movement of said light source and coupled to the headlamps of the road vehicle so that movement of said member causes adjustment of the inclination of the beams of the headlamps, a mask movable with said member and positioned between said light source and said light-sensitive devices, and actuating means operable under the control of said light-sensitive devices to move said member in either direction to adjust the inclination of the headlamp beams upwardly or downwardly, the arrangement being such that when said headlamp beams are correctly inclined for a given attitude of the vehicle body said mask is in a position masking both of said light-sensitive devices from said light source so that said actuating means in inoperative whereas if the inclination of said headlamp beams is too high or to low for a given attitude of the vehicle body, then one or other of said pair of light-sensitive devices will be exposed to said light source thereby causing said actuating means to be operated to move said member to reestablish the correct inclination of the headlamp beams. One example of the invention is illustrated in the accompanying drawings, wherein, FIG. 1 is a fragmentary perspective view of part of the lighting system of a road vehicle, FIGS. 2, 3 and 4 are diagrammatic plan views illustrating the operation of the system, and FIG. 5. is a diagram of part of the electrical circuit of the system shown in FIG. 1.

Referring to the drawings, the system includes a movable strip 11 which is coupled at one end to the headlamps of the road vehicle in which the system is utilized. The headlamps of the road vehicle are pivotally mounted on the body of the road vehicle for movement about a horizontal axis, so that the inclination of the beams of the headlamps can be adjusted upwardly or downwardly by pivoting the headlamps relative to the body of the vehicle. Movement of the strip 11 longitudinally in one direction causes the beams of the headlamps to be inclined downwardly, while movement of the strip ll longitudinally in the opposite direction causes the beams of the headlamps to be inclined upwardly. The system further includes a sensing device 12 including a plate 13 secured to a part circular spring strip 14 midway between the ends of the strip 14. The ends of the strip 14 are secured respectively to the ends of a pair of generally parallel bimetallic strips 15, 16 which at their other ends are secured to a mounting plate 17 which in turn is secured to a housing. A heating coil 18 is wound around the bimetallic strip 16, one end of the coil 18 being earthed and the other end of the coil 18 being connected through a rheostat to one terminal of the battery of the vehicle, the other terminal of the battery being connected to earth. The fixed part of the rheostat is secured to the body of the road vehicle, while the movable part of the rheostat is connected to a front suspension member of the vehicle so that alterations in the height of the front of the vehicle relative to the ground cause alterations in the setting of the rheostat, and consequential alterations in the heating current supplied to the heating coil 18. A similar heating coil 19 is wound round the bimetallic strip 16 and the coil 19 is similarly connected to a further rheostat, the fixed part of which is secured to the rear part of the vehicle body while the movable part thereof is secured to a rear suspension member of the vehicle in such a manner that variations in the position of the rear of the vehicle body relative to the ground cause alteration in the heating current supplied to the coil 19.

Positioned between the bimetallic strips 15,16 adjacent the rear surface of the plate 13 is a light bulb 21. The plate 13 is provided with a aperture 22 through which light from the bulb 21 can shine, and spaced from the plate 13 on the side thereof remote from the bulb 21 are a pair of light-sensitive cells 23,24. The cells 23,24 are positioned side by side in a plane parallel with the plane of the plate 13, and positioned between the cells 23,24 and the plate 13, is a mask 25 integral with the strip 11.

The light-sensitive cells 23,24, are electrically connected through a control unit 26 to a reversible electric motor 27 which when operating drives a pinion 28 engaged with a rack 29 integral with the strip 11, so that the motor 27 can move the strip 11 longitudinally to adjust the inclination of the headlamp beams. The arrangement of the light-sensitive cells 23,24 and the control unit 26 is such that when light falls on the cell 23, the motor 27 is caused to operate in a direction to drive the strip 11 to the left as shown in the drawings to raise the inclination of the headlamps whereas when light falls on the cell 24 the motor 27 is caused to operate in a direction to move the strip 11 to the right to lower the inclination of the beams of the headlamps. When no light falls on either of the cells 23,24 the motor 27 is inoperative.

In use, when the body of the road vehicle is parallel with the ground occupied by the vehicle, the settings of the rheostats controlled by the front and rear suspensions of the vehicle will be the same, and consequently the heating current flowing in the coil 18 will be equal to the heating current flowing in the coil 19 so that the strips 15,16 will be heated by the same amount and will flex through the same angle. The strips 15,16 are arranged to flex towards one another when heated, and since the strips 15,16 flex by the same amount the position of the midpoint of the spring strip 14 and consequently the position of the plate 13 will not change. HOwever, when for example, the rear of the vehicle is loaded the rear of the vehicle will move downwardly relative to the ground and the setting of the rheostat will no longer be the same. Since the setting of the rheostats are different then the heating currents flowing in the coils 18,19 will be different and the strips 15,16 will flex by different amounts whereby moving the plate 13. The initial setting of the system is such that when the inclination of the beams of the headlamps is correct for a given attitude of the body of the vehicle relative to the ground, then the mask 25 masks the cells 23,24 from the light source constituted by the aperture 22 in the plate 13 so that no light falls on the cells 23,24 and the motor 27 is inoperative. However, when the loading of the vehicle is changed the plate 13 will be moved, as described above, relative to the mask 25 and so light issuing from the aperture 22 will fall on either the light-sensitive cell 23 of the light-sensitive cell 24 When the rear of the vehicle is loaded the rear of the vehicle will move downwardly, and so the beams of the headlamps will be at an undesirably high inclination relative to the ground. However, the downward movement of the rear of the vehicle will change the setting of the rheostat associated with the rear suspension of the vehicle, and the rheostat is so arranged that the current flowing in the heating coil 19 is reduced as the rear of the vehicle moves downwardly. Thus, the heating current is the coil 19 will be less than the heating current in the coil 18 and so the strip 16, will be flexed through a smaller angle than that through which the strip 15 is flexed and consequently the plate 13 and therefore the light source constituted be the aperture 22 will be moved to the right as shown in the drawings. Movement of the aperture 22 to the right takes place relative to the mask 25, and so light issuing from the aperture 22 falls on the photocell 24. As stated above, when light falls on the photocell 24 the motor 27 is operated in a direction to move the strip 11 to the right to lower the inclination of the beams of the headlamps. Thus the motor 27 is operated in a direction to move lower the inclination of the beams of the headlamps until the mask 25 again masks both light-sensitive cells, whereupon the inclination of the beams of the headlamps will again be correct for the attitude of the body of the vehicle, and the motor 27 will cease to operate.

The operation of the system when the front of the vehicle is loaded is similar to that described above, with the exception that the movements of the parts take place in the other direction.

It will be appreciated that if desired, instead of mounting the bulb 21 behind the plate 13, the providing an aperture 22 in the plate to constitute the light source of the sensing device 12, the plate 13 could carry a bulb.

Having thus described my invention what I claim as new and desire to secure by Letters Patent is:

1. A lighting system for a road vehicle including headlamps, mounted for pivotal movement about generally horizontal axes on the body of the vehicle, sensing means for sensing the attitude of the body of the road vehicle relative to the ground, a light source, means coupling said light source to said sensing means whereby said light source is movable by said sensing means in response to changes in the attitude of the body of the vehicle relative to the ground, first and second light-sensitive devices positioned adjacent one another and aligned in a direction parallel to the direction in which said light source is moved by said sensing means, a member coupled to said headlamps, movable in a direction parallel to the direction of movement of said light source whereby movement of said member causes adjustment of the inclination of the beams of the headlamps by pivoting the headlamps about said horizontal axes, a mask carried by said member and positioned between said light source and said first and second light-sensitive devices, actuating means, said actuating means being operable under the control of said first and second light-sensitive devices, and, means coupling said actuating means to said member so that operation of said actuating means causes movement of said member to adjust the inclination of the beams of said headlamps, the arrangement being such that when said headlamps beams are correctly inclined for a given attitude of the vehicle body, said mask is in a position masking both of said first and second light-sensitive devices from said light source so that said actuating means is inoperative, whereas if the inclination of said headlamp beams is too high or too low for a given attitude of the vehicle body, then one or other of said firs and second light-sensitive devices will be exposed to said light source causing said actuating means to be operated to move said member to reestablish the correct inclination of the headlamp beams.

2. A system as claimed in claim 1 wherein said movable light source is constituted by an aperture in a plate movable relative to a fixed light-emitting device, light from said device passing through said aperture in use.

3. A system as claimed in claim 1 wherein said sensing means includes a first rheostat operable in response to variation in the position of the front of the vehicle relative to the ground and a second rheostat operable in response to variations in the position of the rear of the vehicle relative to the ground, the rheostats controlling movement of said light source.

4. A system as claimed in claim 3 wherein said first and second rheostats control the heating current supplied to heater windings associated with first and second bimetallic elements respectively, said bimetallic elements controlling movement of said light source.

* * * * *